(12) United States Patent
Rediger et al.

(10) Patent No.: US 8,133,587 B2
(45) Date of Patent: *Mar. 13, 2012

(54) PROPPANT MATERIALS COMPRISING A COATING OF THERMOPLASTIC MATERIAL, AND METHODS OF MAKING AND USING

(75) Inventors: Richard Rediger, Conyers, GA (US); Michael J. Aron, Snellville, GA (US); Bedford W. Fennell, Holcomb, MS (US); Roger Scott Johnson, Snellville, GA (US)

(73) Assignee: Georgia-Pacific Chemicals LLC, Atlanta, GA (US)

( * ) Notice: Subject to any disclaimer, the term of this patent is extended or adjusted under 35 U.S.C. 154(b) by 428 days.

This patent is subject to a terminal disclaimer.

(21) Appl. No.: 12/043,818

(22) Filed: Mar. 6, 2008

(65) Prior Publication Data

US 2008/0202750 A1 Aug. 28, 2008

Related U.S. Application Data

(63) Continuation-in-part of application No. 11/456,897, filed on Jul. 12, 2006, now Pat. No. 8,003,214.

(51) Int. Cl.
*B32B 5/16* (2006.01)
*B05D 7/00* (2006.01)
*E21B 43/01* (2006.01)

(52) U.S. Cl. ............ 428/407; 166/308.1; 166/308.2; 166/310; 427/214; 427/215; 427/221; 427/222

(58) Field of Classification Search .............. 428/403, 428/407; 427/212, 214, 215, 221, 222
See application file for complete search history.

(56) References Cited

U.S. PATENT DOCUMENTS

| | | | |
|---|---|---|---|
| 3,815,680 A * | 6/1974 | McGuire et al. .......... 166/281 |
| 3,929,191 A | 12/1975 | Graham et al. |
| 4,073,343 A | 2/1978 | Harnsberger |
| 4,160,483 A | 7/1979 | Thomas et al. |
| 4,183,813 A | 1/1980 | Black et al. |
| 4,222,444 A | 9/1980 | Hamilton |
| 4,336,842 A | 6/1982 | Graham et al. |
| 4,439,489 A | 3/1984 | Johnson et al. |
| 4,493,875 A | 1/1985 | Beck et al. |
| 4,518,040 A | 5/1985 | Middleton |
| 4,527,627 A | 7/1985 | Graham et al. |
| 4,547,468 A | 10/1985 | Jones et al. |
| 4,569,394 A | 2/1986 | Sweatman et al. |
| 4,585,064 A | 4/1986 | Graham et al. |
| 4,665,990 A | 5/1987 | Perlman |
| 4,852,650 A | 8/1989 | Jennings et al. |
| 4,869,960 A | 9/1989 | Gibb et al. |
| 4,888,240 A | 12/1989 | Graham et al. |
| 4,923,714 A | 5/1990 | Gibb et al. |
| 5,005,641 A | 4/1991 | Mohaupt |
| 5,128,390 A | 7/1992 | Murphey et al. |
| 5,188,175 A | 2/1993 | Sweet |
| 5,217,074 A | 6/1993 | McDougall et al. |
| 5,311,946 A | 5/1994 | Harry et al. |
| 5,316,792 A | 5/1994 | Harry et al. |
| 5,318,382 A | 6/1994 | Cahill |
| 5,330,005 A | 7/1994 | Card et al. |
| 5,370,184 A | 12/1994 | McDougall et al. |
| 5,411,093 A | 5/1995 | Jennings, Jr. |
| 5,422,183 A | 6/1995 | Sinclair et al. |
| 5,425,994 A | 6/1995 | Harry et al. |
| 5,439,055 A | 8/1995 | Card et al. |
| 5,492,178 A | 2/1996 | Nguyen et al. |
| 5,500,174 A | 3/1996 | Scott |
| 5,501,274 A | 3/1996 | Nguyen et al. |
| 5,501,275 A | 3/1996 | Card et al. |
| 5,520,250 A | 5/1996 | Harry et al. |
| 5,578,371 A | 11/1996 | Taylor et al. |
| 5,582,249 A | 12/1996 | Caveny et al. |
| 5,639,806 A | 6/1997 | Johnson et al. |
| 5,656,176 A | 8/1997 | Scott |
| 5,697,440 A | 12/1997 | Weaver et al. |
| 5,728,302 A | 3/1998 | Connor et al. |
| 5,775,425 A | 7/1998 | Weaver et al. |
| 5,787,986 A | 8/1998 | Weaver et al. |
| 5,833,000 A | 11/1998 | Weaver et al. |
| 5,837,656 A | 11/1998 | Sinclair et al. |
| 5,839,510 A | 11/1998 | Weaver et al. |
| 5,853,048 A | 12/1998 | Weaver et al. |
| 5,916,933 A | 6/1999 | Johnson et al. |
| 5,929,437 A | 7/1999 | Elliott et al. |
| 5,948,734 A | 9/1999 | Sinclair et al. |
| 5,955,144 A | 9/1999 | Sinclair et al. |
| 5,964,291 A | 10/1999 | Bourne et al. |

(Continued)

FOREIGN PATENT DOCUMENTS

CA 1057649 A1 7/1979

(Continued)

OTHER PUBLICATIONS

Conductivity Endurance Technology, Top Technology Solutions 2006, 2006 Halliburton, H04898, Apr. 2006.

(Continued)

*Primary Examiner* — Hoa (Holly) Le
(74) *Attorney, Agent, or Firm* — Michael S. Kerns

(57) ABSTRACT

The present invention provides thermoplastic coated proppants and methods for preparing the thermoplastic coated proppants. Methods for using these proppants in subterranean well formations and hydraulic fracturing operations, for example, are also disclosed.

36 Claims, No Drawings

U.S. PATENT DOCUMENTS

| | | | |
|---|---|---|---|
| 6,017,854 A | 1/2000 | Van Slyke | |
| 6,047,772 A | 4/2000 | Weaver et al. | |
| 6,059,034 A | 5/2000 | Rickards et al. | |
| 6,114,410 A | 9/2000 | Zbetzold | |
| 6,116,342 A | 9/2000 | Clark et al. | |
| 6,209,643 B1 | 4/2001 | Nguyen et al. | |
| 6,330,916 B1 | 12/2001 | Rickards et al. | |
| 6,364,018 B1 | 4/2002 | Brannon et al. | |
| 6,406,789 B1 | 6/2002 | McDaniel et al. | |
| 6,439,309 B1 | 8/2002 | Martherly et al. | |
| 6,528,157 B1 | 3/2003 | Hussain et al. | |
| 6,582,819 B2 | 6/2003 | McDaniel et al. | |
| 6,626,241 B2 | 9/2003 | Nguyen | |
| 6,632,527 B1 | 10/2003 | McDaniel et al. | |
| 6,732,800 B2 | 5/2004 | Acock et al. | |
| 6,749,025 B1 | 6/2004 | Brannon et al. | |
| 6,817,414 B2 | 11/2004 | Lee | |
| 6,832,650 B2 | 12/2004 | Nguyen et al. | |
| 6,892,813 B2 * | 5/2005 | Nguyen et al. | 166/276 |
| 7,073,581 B2 | 7/2006 | Nguyen et al. | |
| 7,153,575 B2 | 12/2006 | Anderson et al. | |
| 7,210,528 B1 | 5/2007 | Brannon et | |
| 7,244,492 B2 | 7/2007 | Sinclair et al. | |
| 7,270,879 B2 | 9/2007 | McCrary | |
| 7,426,961 B2 | 9/2008 | Stephenson et al. | |
| 7,491,444 B2 | 2/2009 | Smith et al. | |
| 7,624,802 B2 * | 12/2009 | McCrary et al. | 166/280.2 |
| 7,713,918 B2 * | 5/2010 | Stephenson et al. | 507/269 |
| 7,754,659 B2 * | 7/2010 | Rediger et al. | 507/269 |
| 8,003,214 B2 * | 8/2011 | Rediger et al. | 428/407 |
| 2003/0205376 A1 | 11/2003 | Ayoub et al. | |
| 2003/0224165 A1 | 12/2003 | Anderson et al. | |
| 2004/0040708 A1 | 3/2004 | Stephenson et al. | |
| 2004/0094300 A1 | 5/2004 | Sullivan et al. | |
| 2004/0200617 A1 | 10/2004 | Stephenson et al. | |
| 2005/0019574 A1 | 1/2005 | McCrary | |
| 2005/0028979 A1 | 2/2005 | Brannon et al. | |
| 2005/0059558 A1 | 3/2005 | Blauch et al. | |
| 2005/0096207 A1 | 5/2005 | Urbanek | |
| 2006/0035790 A1 | 2/2006 | Okell et al. | |
| 2006/0037755 A1 | 2/2006 | Knobloch | |
| 2006/0078682 A1 | 4/2006 | McDaniel et al. | |
| 2006/0146643 A1 | 7/2006 | Allen | |
| 2007/0054121 A1 | 3/2007 | Weintritt et al. | |
| 2008/0011477 A1 | 1/2008 | Rediger et al. | |
| 2008/0202750 A1 | 8/2008 | Rediger et al. | |
| 2008/0277115 A1 | 11/2008 | Rediger et al. | |
| 2008/0283243 A1 | 11/2008 | Rediger et al. | |

FOREIGN PATENT DOCUMENTS

| | | |
|---|---|---|
| CA | 1185778 | 4/1985 |
| CA | 1202882 | 4/1986 |
| CN | 1508390 A | 6/2004 |
| CN | 1730422 A | 2/2006 |
| EP | 0169412 A1 | 1/1986 |
| EP | 1400818 A2 | 3/2004 |
| EP | 0308257 A2 | 11/2008 |
| GB | 2050467 A | 1/1981 |
| GB | 2370054 A | 6/2002 |
| GB | 2426023 A | 11/2006 |
| WO | 99/27229 A1 | 6/1999 |
| WO | WO00/05302 | 2/2000 |
| WO | 03/011588 A1 | 2/2003 |
| WO | 03/023177 A2 | 3/2003 |
| WO | 03/089757 A1 | 10/2003 |
| WO | 2004/083600 | 9/2004 |
| WO | 2004/083600 A1 | 9/2004 |
| WO | WO2004/092254 | 10/2004 |
| WO | 2005/095202 A1 | 10/2005 |
| WO | 2006/034298 A2 | 3/2006 |
| WO | 2008/033225 A2 | 3/2008 |
| WO | 2005/000993 A1 | 10/2009 |

OTHER PUBLICATIONS

Advances in Coalbed Methane, Hart Energy Publications, Chemical Week Associates, May 2003.

Written Opinion of the International Searching Authority for PCT/US07/72212, mailed Nov. 27, 2007, six pages, European Patent Office, Rijswijk, Netherlands.

International Search Report and Written Opinion of the International Searching Authority for PCT/US08/62890, mailed Aug. 1, 2008, six pages, European Patent Office, Rijswijk, Netherlands.

International Search Report and Written Opinion of the International Searching Authority for PCT/US08/63055, mailed Aug. 13, 2008, seven pages, European Patent Office, Rijswijk, Netherlands.

"Density of Various solids", CRC Handbook of Chemistry and Physics, 90th edition, 2009-2010, section 15, p. 39.

International Search Report and Written Opinion of the International Searching Authority for PCT/US09/36326, mailed Jun. 26, 2009, nine pages, European Patent Office, Rijswijk, Netherlands.

International Search Report for PCT/US2008/062890, mailed Sep. 1, 2008, European Patent Office, Rijswijk, Netherlands.

International Search Report for PCT/US2008/063055, mailed Sep. 2, 2008, European Patent Office, Rijswijk, Netherlands.

International Search Report for PCT/US2007/072212 mailed on Nov. 27, 2007.

COOL-LOK 250F Hot Melt, National Starch & Chemicals, 2000.

\* cited by examiner

PROPPANT MATERIALS COMPRISING A COATING OF THERMOPLASTIC MATERIAL, AND METHODS OF MAKING AND USING

CROSS-REFERENCE TO RELATED APPLICATIONS

This application is a continuation-in-part application of U.S. patent application Ser. No. 11/456,897, filed on Jul. 12, 2006, now U.S. Pat. No. 8,003,214 the disclosure of which is incorporated herein by reference in its entirety.

BACKGROUND OF THE INVENTION

The present invention relates generally to improved proppant compositions and the methods for their use in hydraulic fracturing treatments, gravel packing for sand control, and in other well formation treatments.

SUMMARY OF THE INVENTION

The present invention is directed generally to thermoplastic coated proppants, methods for preparing the thermoplastic coated proppants, and methods for using these proppants in, for example, subterranean well formations and hydraulic fracturing operations. Coated proppants of the present invention are free-flowing, and are not tacky at ambient conditions, yet exhibit latent tackiness at the elevated temperatures and pressures often encountered in subterranean formations.

The present invention discloses novel coated proppant materials. According to one aspect of the present invention, the coated proppant comprises (i) a particle, and (ii) a thermoplastic coating on the particle. In another aspect, the coated proppant can further comprise an outer thermoset coating surrounding the thermoplastic coating.

Methods of making coated proppants are also provided herein. One such method comprises applying a thermoplastic coating onto a particle to obtain a coated proppant. Optionally, an outer thermoset coating surrounding the thermoplastic coated proppant can be applied.

The present invention also contemplates methods of using coated proppants in applications such as hydraulic fracturing, gravel packing, and well formation treatments. For example, a method of treating a subterranean formation is provided, the method comprising (a) introducing a fluid suspension of coated proppants to the subterranean formation; (b) depositing the coated proppants in the subterranean formation; (c) subjecting the coated proppants to a temperature above the thermal transition point temperature of the thermoplastic coating on the particle; (d) agglomerating the thermoplastic coating of the coated proppants to form a stable framework of proppant particles. The coated proppant comprises (i) a particle, and (ii) a thermoplastic coating on the particle.

In accordance with another aspect of the present invention, a coated proppant is provided. In this aspect, the coated proppant comprises (i) a particle, and (ii) a thermoplastic coating on the particle, wherein the thermoplastic coating comprises a pine rosin, a modified rosin, a rosin ester, or any combination thereof. Methods of making and methods of using this coated proppant are also provided.

DETAILED DESCRIPTION OF THE INVENTION

The present invention is directed generally to thermoplastic coated proppants, methods for preparing the thermoplastic coated proppants, and methods for using these proppants in, for example, subterranean well formations and hydraulic fracturing operations. Coated proppants of the present invention are both free-flowing and not tacky at ambient conditions. This improves the ease in handling the proppants prior to and during their use. For example, these coated proppants do not need to be transported to a well site in slurry or suspension form, but can be distributed in bulk quantities as free-flowing solids.

At the elevated temperatures and pressures often encountered in subterranean formations, the coated proppants exhibit latent tackiness which results in the agglomeration of the coated proppants to form a stable framework of proppant particles. Such a stable framework or network of agglomerated proppant particles reduces both solid particle flow-back and the transport of formation fines from the subterranean formation.

To define more clearly the terms and concepts disclosed herein, the following definitions are provided. To the extent that any definition or usage provided by any document incorporated herein by reference conflicts with the definition or usage provided herein, the definition or usage provided herein controls.

The terms "particle," "particulate," "particulate material," and the like, when unmodified, are used herein to indicate the base material which, when coated, forms a "proppant." For example, frac sand is a material that is often referred to in the art as a "proppant," but in this disclosure, it is referred to as a "particle." The terms "proppant," "proppant particle," "coated proppant," and the like, are reserved for thermoplastic coated particles in accordance with the teachings of this invention.

The term "free-flowing" is used herein to mean that the proppant particles do not agglomerate appreciably, and generally remain as discrete, individual proppant particles. Proppants of the present invention are "free-flowing" at ambient conditions, i.e., at a temperature of about 20-25° C. and at atmospheric pressure. The flowability of the solid particles can be measured using a test method such as the American Foundrymen's Society Procedure 227-87-S, entitled "Moldability of Molding Sand Mixtures" as found in the Mold & Core Test Handbook, 2nd edition (1989), which is incorporated herein by reference. The test procedure involves placing a 200-gram sample of solid particles in a cylindrical 8-mesh screen of a rotary screen device driven by a 57 rpm motor. The screen is rotated for 10 seconds. In accordance with this test, the moldability index is equal to the weight of the product passing through the screen divided by the original weight charged to the screen chamber (i.e., 200 grams). If all of the material passes through the screen, the moldability index is 100%. In accordance with the present invention, free-flowing proppants have a moldability index of greater than about 80% at ambient conditions. For instance, the proppants disclosed herein can have a moldability index greater than about 85%, or greater than about 90%. In some aspects of this invention, the coated proppants have a moldability index of greater than about 95%, or alternatively, greater than about 98%. Generally, solid materials that are not free-flowing have a moldability index of less than about 50%. Such materials can, in some cases, have a moldability index of less than about 40%, or less than about 25%.

The term "tacky" is used herein to refer to the property of being gummy to the touch, or sticky. Proppant particles which are tacky often stick together, agglomerate, and have either limited free-flow characteristics, or none at all. Force is generally needed to move or separate tacky proppant particles. Tackiness can be measured by placing 200 grams of the proppant material on a smooth, horizontal glass plate. The plate is then tilted to a 45 degree angle. This procedure is discussed in co-pending U.S. patent application Ser. No. 11/803,688, the disclosure of which is incorporated herein by reference in its entirety. For non-tacky proppants of the present invention, greater than about 80% of the initial 200-gram sample will run off the plate when positioned at a 45 degree angle, under ambient temperature and pressure. Often, for non-tacky proppants, greater than about 85%, greater than about 90%, or greater than about 95%, of the initial 200-gram charge will run off the plate when positioned at a 45 degree angle. Conversely, for tacky proppants, generally less than about 50% of the initial 200-gram sample will run off of the plate. For some tacky proppants, less than about 40%, less than about 30%, or less than about 20%, of the initial sample will run off the plate when positioned at a 45 degree angle. By placing the glass plate in an oven set at a desired temperature, this test procedure can also be employed for determining the tackiness that develops as the coated proppants are heated close to or past their softening or melting point. Generally, about 10 minutes in the oven is sufficient to allow the glass plate and the proppant sample to reach the desired temperature for testing, at which point the horizontal glass plate is tilted to a 45 degree angle. As the coating on the proppant softens and tackiness develops, the coated proppant particles will show a reduced tendency to run off the plate.

Although any methods, devices, and materials similar or equivalent to those described herein can be used in the practice or testing of the invention, the typical methods, devices and materials are herein described.

All publications and patents mentioned herein are incorporated herein by reference for the purpose of describing and disclosing, for example, the constructs and methodologies that are described in the publications, which might be used in connection with the presently described invention. The publications discussed throughout the text are provided solely for their disclosure prior to the earliest filing date of the subject matter of the present application. Nothing herein is to be construed as an admission that the inventors are not entitled to antedate such disclosure by virtue of prior invention.

Applicants disclose several types of ranges in the present invention. These include, but are not limited to, a range of thermal transition point temperatures, a range of particle sizes, a range of coating thicknesses, a range of coating weight percents, and so forth. When Applicants disclose or claim a range of any type, Applicants' intent is to disclose or claim individually each possible number that such a range could reasonably encompass, including end points of the range as well as any sub-ranges and combinations of sub-ranges encompassed therein. For example, when the Applicants disclose or claim a temperature range, Applicants' intent is to disclose or claim individually every possible number that such a range could encompass, consistent with the disclosure herein. For example, by the disclosure that a thermal transition point temperature is in the range from about 30° C. to about 200° C., as used herein, Applicants intend to recite that the thermal transition point temperature can be selected from about 30° C., about 35° C., about 40° C., about 45° C., about 50° C., about 55° C., about 60° C., about 65° C., about 70° C., about 75° C., about 80° C., about 85° C., about 90° C., about 95° C., about 100° C., about 105° C., about 110° C., about 115° C., about 120° C., about 130° C., about 135° C., about 140° C., about 145° C., about 150° C., about 155° C., about 160° C., about 165° C., about 170° C., about 175° C., about 180° C., about 185° C., about 190° C., about 195° C., or about 200° C., as well as any range between about 30° C. and about 200° C. (for example, the thermal transition point temperature is in a range from about 30° C. to about 175° C., or from about 60° C. to about 100° C.), and this also includes any combination of ranges between about 30° C. and about 200° C. (for example, about 60° C. to about 100° C., and about 125° C. to about 175° C.).

Similarly, another representative example follows for the weight percent of the thermoplastic coating based on the weight of the particle in a coated proppant provided in one aspect of this invention. By a disclosure that the thermoplastic coating is from about 1% to about 8% by weight of the particle, Applicants intend to recite that the weight percent can be selected from about 1%, about 1.5%, about 2%, about 2.5%, about 3%, about 3.5%, about 4%, about 4.5%, about 5%, about 5.5%, about 6%, about 6.5%, about 7%, about 7.5%, or about 8%. Additionally, the weight percent can be within any range from about 1% to about 8% (for example, the weight percent is in a range from about 2% to about 7%), and this also includes any combination of ranges between about 1% and about 8%. Likewise, all other ranges disclosed herein should be interpreted in a manner similar to these two examples.

Applicants reserve the right to proviso out or exclude any individual members of any such group, including any sub-ranges or combinations of sub-ranges within the group, that can be claimed according to a range or in any similar manner, if for any reason Applicants choose to claim less than the full measure of the disclosure, for example, to account for a reference that Applicants may be unaware of at the time of the filing of the application. Further, Applicants reserve the right to proviso out or exclude any individual thermoplastic materials or thermoset materials, or any members of a claimed group, if for any reason Applicants choose to claim less than the full measure of the disclosure, for example, to account for a reference that Applicants may be unaware of at the time of the filing of the application.

While compositions and methods are described in terms of "comprising" various components or steps, the compositions and methods can also "consist essentially of" or "consist of" the various components or steps.

The present invention is directed to coated proppants, methods for preparing the coated proppants, and methods for using these proppant particles in subterranean well formations and hydraulic fracturing operations, for example. A coated proppant in accordance with one aspect of the present invention comprises (i) a particle, and (ii) a thermoplastic coating on the particle.

The present invention is not limited to any specific type of particulate material for use as the proppant substrate (before providing the particle or particulate with the coating containing thermoplastic material in accordance with the present invention), so long as the particle has sufficient strength to withstand the stresses, such as elevated temperature and pressure, often encountered in oil and gas recovery applications. In one aspect of the present invention, the particle of the coated proppant is a sand, a naturally occurring mineral fiber, a ceramic, a bauxite, a glass, a metal bead, a walnut hull, a composite particle, and the like. For instance, the sand can be a graded sand or a resin-coated sand. Such resin-coated sands include sand particles coated with a curable thermosetting resin, for example, as described in U.S. Pat. No. 5,837,656, the disclosure of which is incorporated herein by reference in its entirety. These resin-coated sands can serve as particles in the present invention. A ceramic can include both porous and non-porous ceramic materials, while a bauxite can include sintered bauxite materials. Composite particles are an agglomeration of smaller, fine particles held together by a binder, and such composite particles can be the particulate material in the present invention. Compositions containing coated proppants can employ mixtures or combinations of more than one type of particle, for instance, both a sand and a ceramic can be coated and then mixed to form a composition of coated proppants. It is contemplated that any particulate material suitable for use in proppant applications can be used in the present invention, regardless of the specific gravity of the particle, although it can be beneficial in certain applications to have a lower specific gravity to increase the distance that the proppants can be carried into a formation prior to settling.

In another aspect, the particle is either a porous ceramic or porous polymer particle. Such particles are described in, for example, U.S. Patent Publication Nos. 2004/0040708 and 2004/0200617, the disclosures of which are incorporated herein by reference in their entirety. These porous ceramic or porous polymer materials can be of natural origin or can be produced synthetically. Although the use of such materials is not limited by specific gravity, the specific gravity of these materials is generally less than about 3 g/cc, or less than about 2.7 g/cc. In another aspect, the specific gravity of the porous particle is less than about 2.5 g/cc, for example, less than about 2.2 g/cc.

The particle size of the particle used in the coated proppant of the present invention generally falls within a range from about 100 microns to about 3000 microns (about 3 mm). In another aspect, the particle size is from about 125 microns to about 2500 microns, from about 150 microns to about 2000 microns, or from about 175 microns to about 1500 microns. Yet, in another aspect, the particle of the coated proppant of the present invention has a particle size that falls within a narrower range of about 200 to about 1000 microns, for example, about 250 to about 800 microns, or from about 300 to about 700 microns.

In another aspect of this invention, the particles generally have a mesh size from about 8 and about 100, based on the U.S. Standard Sieve Series. For example, in a distribution of such particles which can be added to a treating fluid for use in a subterranean formation, at least about 90% by weight of the particles have a particle size falling within the range from about 8 to about 100 mesh. In accordance with another aspect of the present invention, at least about 95% by weight of the particles in a coated proppant composition have a size within the range from about 8 to about 100 mesh. Further, 90% by weight or more (e.g., 95% or more) of the particles in a coated proppant composition can have a size within the 20 to 40 mesh range in another aspect of this invention.

In a different aspect, the particle in the coated proppant has a size in the range from about 8 to about 140 mesh, from 10 to about 120 mesh, from about 10 to about 100 mesh, or from about 14 to about 80 mesh. In other aspects of this invention, the particle is in a range from about 18 to about 60 mesh, or from about 20 mesh to about 40 mesh. In another aspect, there is less than about 10% by weight, for example, 5% by weight of less, of particles in a coated proppant composition having a size of less than about 20 mesh or greater than about 50 mesh.

The coated proppants of the present invention generally comprise particles which are not limited to any particular material or size.

A coated proppant of the present invention also contains a thermoplastic coating on the particle. Such a coating provides the coated proppant with latent tackiness, in that the tackiness of the coating is not exhibited until the proppant is deposited in, for example, a subterranean formation at elevated temperature and pressure. At ambient conditions of about 20-25° C. and at atmospheric pressure, the coated proppants, which exhibit latent tackiness, are free-flowing and non-tacky.

Suitable thermoplastic materials for use in providing the coating on the particle in accordance with the present invention can have a thermal transition point temperature (TTPT) in the range from about 30 to about 200° C. The thermal transition point temperature is measured by the melting point or the softening point of the thermoplastic coating, and reflects the temperature at which the material is able to soften, flow, become sticky or tacky, and/or exhibit adhesive characteristics. Temperatures in the range from about 30 to about 200° C. are often encountered by proppant materials in their use in subterranean formations.

The softening point and melting point of potentially useful thermoplastic materials can be determined by any means and apparatus known to one of ordinary skill in the art. Two methods for determining the softening point of resins are the Mettler Cup and Ball test method (ASTM D 6090-99) and the Vicat Softening Point test method (ASTM D 1525). Two instruments for determining the melting point of a thermoplastic include a capillary melt point instrument and a Differential Scanning Calorimeter (abbreviated DSC, ASTM D 3418-03). In the present invention, if any one of the four above listed tests for softening point or melting point results in a temperature within a claimed range (for example, in the range from about 60° C. to about 100° C.), then the TTPT is deemed to be within the claimed range.

At a temperature below the TTPT, such as ambient temperature conditions, the coated proppant is free-flowing and can be packaged, transported to and handled at the well head without the need for any specialized equipment or skilled labor. Since the coated proppants are not tacky at ambient conditions, the coated proppant particles do not have to be stored and/or transported as a slurry or suspension in a liquid diluent. The adhesive character of the thermoplastic coating is not exhibited until the coated proppants are deposited in the subterranean formation at elevated temperature and pressure (i.e., latent tackiness).

In accordance with one aspect of the present invention, the thermoplastic coating of the coated proppant has a thermal transition point temperature in the range from about 30 to about 200° C. In another aspect, the thermoplastic coating has a TTPT in the range from about 40 to about 180° C., from about 45 to about 160° C., or from about 50 to about 150° C. Yet, in another aspect, the thermoplastic coating has a TTPT in the range from about 55 to about 125° C., or from about 60 to about 100° C. In accordance with a different aspect of the present invention, the thermoplastic coating has a TTPT in the range from about 50 to about 175° C. such as, for example, from about 70 to about 140° C.

Coated proppants of the present invention comprise a thermoplastic coating on the particle. This coating comprises at least one thermoplastic material, and thermoplastic materials suitable for use in accordance with the present invention include, but are not limited to, a polyethylene, a polypropylene, an ethylene vinyl acetate, an ethylene ethyl acrylate, a styrene-isoprene-styrene, an acrylonitrile-butadiene-styrene, a styrene-butadiene-styrene, a polystyrene, a polyurethane, an acrylic polymer, a polyvinyl chloride, a fluoroplastic, a pine rosin (e.g., tall oil rosin, wood rosin, and gum rosin), a modified rosin (e.g., disproportionated rosins, hydrogenated rosins, polymerized or oligomerized rosins, diels-alder rosin adducts), a rosin ester (e.g., hydrogenated rosin esters, polymerized rosin esters, phenolic-modified rosin esters, dibasic acid-modified rosin esters; the rosin esters can be derived from tall oil rosin, wood rosin, and/or gum rosin), a polysulfide, a styrene-acrylonitrile, a nylon, a phenol-formaldehyde novolac resin, or a combination thereof. Other non-limiting examples of thermoplastic materials that can be used in the present invention include oligomers of $C_5$ hydrocarbons (e.g., oligomers of cyclopentadiene), oligomers of $C_9$ hydrocarbons (e.g., oligomers of alpha-methylstyrene and vinyl toluene, often referred to as aromatic hydrocarbon tackifiers), terpene resins (e.g., oligomers of terpenes such as alpha-pinene, beta-pinene, and limonene), oligomeric reaction products of terpenes and phenolics, coumarone-indene resins, oligomeric reaction products of terpenes and styrenics, or combinations thereof. Generally, the selection of a particular thermoplastic material for use in the coated proppants of the present invention will depend, in part, on the TTPT of the respective thermoplastic material (e.g., the softening point) and the anticipated thermal conditions of the particular end-use application.

Phenolic novolac resins generally are produced with a formaldehyde to phenol molar ratio that is less than about 0.8:1. Phenolic novolacs have a shortage of formaldehyde and, therefore, are thermoplastic materials which will not cure in the absence of a crosslinking agent (e.g., hexamine). Rosin esters can be produced by condensing, for example, a tall oil rosin with a polyol. Similar ester products can be produced using other rosin sources, such as wood rosin and gum rosin, and these materials also fall within the scope of the present invention.

The thermoplastic coating of the present invention comprises at least one thermoplastic material. This thermoplastic material, in one aspect of the invention, can be a polyethylene, a polypropylene, an ethylene vinyl acetate, an ethylene ethyl acrylate, a styrene-isoprene-styrene, an acrylonitrile-butadiene-styrene, a styrene-butadiene-styrene, a polystyrene, a polyurethane, an acrylic polymer, a polyvinyl chloride, a fluoroplastic, a polysulfide, a styrene-acrylonitrile, a nylon, a phenol-formaldehyde novolac resin, or any combination thereof. In another aspect, the thermoplastic material is a pine rosin, a modified rosin, a rosin ester, or any combination thereof. Yet, in another aspect, the thermoplastic material is a terpene resin, a coumarone-indene resin, an oligomer of $C_5$ hydrocarbons, an oligomer of $C_9$ hydrocarbons, an oligomeric reaction product of a terpene and a phenolic, an oligomeric reaction product of a terpene and a styrenic, or combinations thereof. Generally, the number-average molecular weight of these oligomeric materials is less than about 10,000, and more often, less than about 5000. For instance, in one aspect of the present invention, the number-average molecular weight of the terpene resin, the coumarone-indene resin, the oligomer of $C_5$ hydrocarbons, the oligomer of $C_9$ hydrocarbons, the oligomeric reaction product of a terpene and a phenolic, and the oligomeric reaction product of a terpene and a styrenic, are all within a range from about 100 to about 4000. The number-average molecular weight of these materials can be in a range from about 125 to about 3000, from about 150 to about 2000, or from about 200 to about 1000, in other aspects of this invention.

In accordance with another aspect of the present invention, the thermoplastic material can be selected from among an ethylene vinyl acetate, a phenol-formaldehyde novolac resin, a pine rosin, a modified rosin, a rosin ester, a terpene resin, a coumarone-indene resin, an oligomer of $C_5$ hydrocarbons, an oligomer of $C_9$ hydrocarbons, an oligomeric reaction product of a terpene and a phenolic, and an oligomeric reaction product of a terpene and a styrenic, or any combination thereof. The Applicants have contemplated, for instance, that the thermoplastic coating comprises a thermoplastic material such as ethylene vinyl acetate. Similarly, the thermoplastic coating can comprise a thermoplastic material which is selected from a pine rosin, a modified rosin, or a rosin ester, or a combination thereof.

For example, hot melt adhesive grades Opt-E-Bond™ HL0033, manufactured by the HB Fuller Co., and Cool-Lok™ 34-250A, manufactured by National Adhesives, can be used in the present invention. Opt-E-Bond™ HL0033 is a hot melt adhesive containing polyethylene wax, while Cool-Lok™ 34-250A is a hot melt adhesive containing ethylene vinyl acetate, paraffin wax, and an aromatic tackifier. Additionally, pine rosins and modified rosins marketed by Georgia-Pacific as NOVARES® 1100 and NOVARES® 1182 are also suitable for use as thermoplastic materials in the present invention. NOVARES® 1100 is a pentaerythritol ester of tall oil rosin and has a softening point in the range of about 96-103° C., while NOVARES® 1182 is a glycerol ester of tall oil rosin and has a softening point in the range of about 80-88° C. A coated proppant, according to one aspect of the present invention comprises (i) a particle, and (ii) a thermoplastic coating on the particle, wherein the thermoplastic coating comprises a pine rosin, a modified rosin, a rosin ester, or a combination thereof. In this aspect, the thermoplastic coating can comprise a glycerol rosin ester or a pentaerythritol rosin ester.

The thermoplastic material is provided as at least a partial coating on the particle. Generally, the thermoplastic coating on the particle completely surrounds the particle. In accordance with the present invention, the thermoplastic coating is from about 0.5% to about 15% by weight of the particle. For example, the weight percent of the thermoplastic coating, based on the weight of the particle, can be from about 1% to about 12%, from about 1% to about 10%, or from about 1% to about 8%. In other aspects, the weight percent of the thermoplastic coating, based on the weight of the particle, is from about 1.5% to about 8%, from about 2% to about 7%, or from about 2.5% to about 6% by weight. Yet, in another aspect, the weight percent of the thermoplastic coating, based on the weight of the particle, is from about 5% to about 8% by weight.

The coating thickness on an individual particle typically is within a range from about 0.1 to about 5 mils, for example, between about 0.2 and about 4 mils, or between about 0.3 and about 3 mils. In another aspect, the thickness of the thermoplastic coating on the particle is in a range from about 0.5 to about 2.8 mils, or from about 0.6 to about 2.5 mils. Further, the thickness of the thermoplastic coating on the particle can be from about 0.75 mils to about 2 mils in other aspects of this invention.

Methods of making coated proppants of the present invention are also provided. One such method comprises applying a thermoplastic coating onto a particle to obtain the coated proppant. For instance, the thermoplastic coating can be applied onto the particle using a warm or hot coat process in which the particle is first heated to a temperature above the melting point of the thermoplastic coating. The thermoplastic coating then is added to the hot particle, and mixed, causing the thermoplastic coating to coat and fuse to the particle, thereby forming the coated proppant. Sufficient time is provided to allow the thermoplastic coating to thoroughly coat the particle, while blending or mixing of the particle with the thermoplastic coating is employed. The resultant hot, coated proppants then are quenched to a temperature below the thermal transition point temperature of the thermoplastic coating to yield non-tacky, free-flowing solids. The coated proppants can be sieved to the desired particle size distribution. Prior to the addition of the thermoplastic coating to the particle, optionally, the thermoplastic coating can be pre-heated to melt the coating by heating the coating material to a temperature in excess of its melting point.

Alternatively, the thermoplastic coating can be dissolved in a suitable solvent, or suspended or emulsified in a suitable solvent, and the thermoplastic-containing solvent then can be applied to the particulate. The coating can be, for example, blended or mixed with, or sprayed onto, the particles to be coated. Other methods known to those of skill in the art also can be used, and such methods may vary based on the particular thermoplastic coating employed. Once the particle is coated, solvent is removed by suitable means (e.g., drying), resulting in free-flowing, coated proppants. Non-limiting examples illustrating the production of coated proppants of the present invention are provided in Constructive Example 1 and Examples 2-3 that follow.

In one aspect of the present invention, the coated proppants of the present invention can be used to treat a subterranean formation. A method of treating a subterranean formation in accordance with this aspect of the present invention comprises (a) introducing a fluid suspension of coated proppants to the subterranean formation; (b) depositing the coated proppants in the subterranean formation; (c) subjecting the coated proppants to a temperature above the thermal transition point temperature of the thermoplastic coating on the particle; and (d) agglomerating the thermoplastic coating of the coated proppants to form a stable framework of proppant particles. In this aspect, the coated proppant comprises (i) a particle, and (ii) a thermoplastic coating on the particle.

The agglomerated framework of proppant particles in the subterranean formation can reduce solid particle flow-back and/or the transport of formation fines from the subterranean formation. Other methods of using the coated proppants of the present invention are also provided in co-pending U.S. patent application Ser. No. 11/456,897, the disclosure of which is incorporated herein by reference in its entirety.

In another aspect of the present invention, a coated proppant is provided which further comprises an outer thermoset coating surrounding the thermoplastic coating. This thermoset coating forms an outer shell of the coated proppant and is formulated to be non-tacky, resulting in free-flowing proppant particles. Under conditions of elevated temperature and pressure, the thermoset coating breaks and exposes the thermoplastic coating (i.e., tacky thermoplastic coating), which can flow and cause agglomeration with adjacent coated proppants or other particulates. Such a structure has a latent tackiness because the outer thermoset shell provides free-flowing proppant particles at ambient temperature and pressure.

The thermoset coating comprises a thermoset material, and thermoset materials suitable for use in accordance with the present invention include, but are not limited to, phenol-formaldehyde resole resins (such as GP-2086 and 761D31, available from Georgia-Pacific), phenol-formaldehyde novolac resins mixed with a cross-linking agent such as hexamine (novolac resins such as GP-2110, GP-2202 and GP-298G87), epoxy resins, and other similar materials. GP-2086 is a liquid phenolic resole resin, and GP-761D31 is an ammonia-catalyzed liquid phenolic resole resin in methanol. GP-2110 is a liquid phenolic novolac resin in methanol, GP-2202 is a flaked phenolic novolac resin, and GP-298G87 is a flaked phenolic novolac resin. Other curable thermosetting materials that can be employed in the present invention include, but are not limited to, unsaturated polyesters, vinyl esters, polyurethanes, melamine-formaldehyde resins, and the like, or combinations thereof. In one aspect of the present invention, the thermoset coating is cured. Curing can be achieved, for example, by means of heat and/or by the addition of a crosslinking or curing agent.

As noted above, phenolic novolac resins generally are produced with a formaldehyde to phenol molar ratio that is less than about 0.8:1. Phenolic novolacs have a shortage of formaldehyde and, therefore, are thermoplastic materials and will not cure in the absence of a crosslinking agent (e.g., hexamine). Phenolic resole resins generally are produced with a formaldehyde to phenol ratio molar ratio that is about 1:1 or more. Resoles are thermosetting and crosslink in the absence of a crosslinking agent.

In one aspect of the present invention, the thermoset coating comprises a phenol-formaldehyde resole resin, a phenol-formaldehyde novolac resin and a crosslinking agent, or a combination thereof.

Generally, the thermoset coating completely surrounds the thermoplastic coating. In accordance with the present invention, the thermoset coating is from about 0.5% to about 15% by weight of the thermoplastic coated proppant. For example, the weight percent of the thermoset coating, based on the weight of the coated proppant, can be from about 1% to about 12%, from about 1% to about 10%, from about 1% to about 8%, from about 1% to about 6%, or from about 1% to about 4% by weight.

The thickness of the thermoset coating on an individual coated proppant typically falls within the range from about 0.2 to about 5 mils, for example, between about 0.3 and about 4 mils, or between about 0.5 and about 3 mils. In another aspect, the thickness of the thermoset coating on the thermoplastic coated particle is in a range from about 0.7 to about 2.8 mils, from about 0.8 to about 2.5 mils, or from about 1 mil to about 2 mils.

Methods for applying a thermoset coating to a thermoplastic coated proppant, and methods of using the coated proppant with the thermoset shell are provided in co-pending U.S. patent application Ser. No. 11/456,897, the disclosure of which is incorporated herein by reference in its entirety. A non-limiting example of the production of a thermoplastic coated proppant with a thermoset coating or shell is provided in Example 4 below.

EXAMPLES

The invention is further illustrated by the following examples, which are not to be construed in any way as imposing limitations to the scope of this invention. Various other aspects, embodiments, modifications, and equivalents thereof which, after reading the description herein, may suggest themselves to one of ordinary skill in the art without departing from the spirit of the present invention or the scope of the appended claims.

Constructive Example 1

A particle (sand or porous ceramic) is added to a heated mixer (mill) and allowed to equilibrate at a temperature of about 232° C. (450° F.). Thereafter, a hot melt resin in an amount of about 6% by weight, based on the weight of the particle, is added to the mixer (mill) as a free-flowing powder. These materials are mixed for one minute and then cooling water is added to reduce the temperature. Mixing is continued until the temperature has been reduced sufficiently to provide a free-flowing coated proppant, which is removed and sized as desired.

Example 2

4,000 grams of a particle, a 20/40 mesh frac grade silica sand from US Silica, were added to a heated electric mixer and allowed to equilibrate at a temperature of 137° C. (280° F.). 120 grams of NovaRes™ 1100 (a pentaerythritol ester of tall oil rosin having a softening point in the range of about 96-103° C.) were added to the preheated sand and allowed to mix for sixty seconds. The coated proppants were then discharged from the mixer and cooled to ambient temperature, resulting in free-flowing and non-tacky proppant particles. The weight percent of the thermoplastic coating, based on the weight of the particle, for the proppants of Example 2 was about 3%.

Example 3

3000 grams of a particle, a 20/40 mesh ceramic particle, were preheated to about 500° F. in an oven. 120 grams of Cool-Lok™ 34-250A (a hot melt adhesive containing ethylene vinyl acetate, paraffin wax, and an aromatic tackifier) were preheated to above its melting point, resulting in a liquid thermoplastic material. The ceramic particle was placed into a preheated sand coating mill. When the temperature of the ceramic particles was about 450° F., as measured by an IR gun, the liquid Cool-Lok™ 34-250A thermoplastic material was added to the ceramic particles and mixed for sixty seconds. Then, 100 grams of water were added to cool the coated proppant particles. After another one to two minutes, the coated proppants were discharged from the coating mill, cooled to ambient temperature, and screened through an 18 mesh sieve, resulting in free-flowing and non-tacky proppant particles. The weight percent of the thermoplastic coating, based on the weight of the particle, for the proppants of Example 3 was about 4%.

Example 4

3,000 grams of a particle, a 20/40 mesh frac grade silica sand from US Silica, were added to a heated electric mixer and allowed to equilibrate at a temperature of 251° C. (485° F.). 60 grams of NovaRes™ 1100 (a pentaerythritol ester of tall oil rosin having a softening point in the range of about 96-103° C.) were added to the preheated sand and allowed to mix for thirty seconds. An outer coat of GP-2202, a flaked phenol-formaldehyde novolac resin, was applied by adding 120 grams of GP-2022 and mixing for an additional thirty seconds. At this point, 18 grams of powdered hexamine were added as a cross-linker and mixing was continued for an additional two minutes to cure the outer layer. The coated proppant with thermoset shell was discharged, screened and cooled.

This coated proppant with thermoset shell was subjected to 8,000 psi pressure for several minutes at ambient temperature (20° C.), then the pressure was removed and material extracted, it was in the form of free-flowing grains. Under these conditions, the outer thermoset shell cracked, exposing the inner thermoplastic coating. However, at ambient temperature, the thermoplastic coating was not tacky.

Another sample of the above-described coated proppant with thermoset shell was preheated in the crush cell at 105° C. and then was subjected to 8,000 psi for several minutes. Upon removing the pressure and extracting the proppant, the material came out in a solid rigid pellet. In this case, the cured outer layer cracked under the pressure and allowed the tacky thermoplastic coating underneath to exude out and bond to neighboring proppant particles.

We claim:
1. A coated proppant comprising:
   a particle; and
   a coating consisting essentially of a thermoplastic material on the particle;
   wherein the thermoplastic material comprises at least one of an ethylene vinyl acetate, a pine rosin, a modified rosin, a rosin ester, a coumarone-indene resin, an oligomer of $C_5$ hydrocarbons, an oligomer of $C_9$ hydrocarbons, an oligomeric reaction product of a terpene and a phenolic, or any combination thereof, and wherein the oligomer of $C_5$ hydrocarbons and the oligomer of $C_9$ hydrocarbons each have a number-average molecular weight of less than about 10,000.

2. The coated proppant of claim 1, wherein the particle is a sand, a naturally occurring mineral fiber, a ceramic, a bauxite, a glass, a metal bead, a walnut hull, or a composite particle.

3. The coated proppant of claim 1, wherein the particle is a porous ceramic or porous polymer particle.

4. The coated proppant of claim 1, wherein the particle has a mesh size from about 8 and about 100, based on the U.S. Standard Sieve Series.

5. The coated proppant of claim 1, wherein the thermoplastic material coating has a thermal transition point temperature in the range from about 30 to about 200° C.

6. The coated proppant of claim 1, wherein the thermoplastic material has a thermal transition point temperature in the range from about 60 to about 100° C.

7. The coated proppant of claim 1, wherein the thermoplastic material comprises an ethylene vinyl acetate, a coumarone-indene resin, an oligomer of $C_5$ hydrocarbons, an oligomer of $C_9$ hydrocarbons, or any combination thereof, and wherein the oligomer of $C_5$ hydrocarbons and the oligomer of $C_9$ hydrocarbons each have a number-average molecular weight of less than about 10,000.

8. The coated proppant of claim 1, wherein the weight percent of the coating, based on the weight of the particle, is from about 1% to about 8%.

9. The coated proppant of claim 1, wherein the thickness of the coating on the particle is in a range from about 0.1 to about 5 mils.

10. The coated proppant of claim 1, further comprising an outer thermoset coating surrounding the coating consisting essentially of the thermoplastic material.

11. The coated proppant of claim 10, wherein the thermoset coating comprises a phenol-formaldehyde resole resin, a mixture of a phenol-formaldehyde novolac resin and a crosslinking agent, or a combination thereof.

12. The coated proppant of claim 10, wherein the thermoset coating is cured.

13. The coated proppant of claim 10, wherein the weight percent of the thermoset coating, based on the weight of the thermoplastic-coated particle, is from about 1% to about 8%.

14. The coated proppant of claim 10, wherein the thickness of the thermoset coating surrounding the inner thermoplastic coating is in a range from about 0.2 to about 5 mils.

15. The coated proppant of claim 1, wherein at least one of the oligomer of $C_5$ hydrocarbons and the oligomer of $C_9$ hydrocarbons is present, and wherein the number-average molecular weight of the oligomer of $C_5$ hydrocarbons and the oligomer of $C_9$ hydrocarbons is less than about 5,000.

16. The coated proppant of claim 1, wherein at least one of the oligomer of $C_5$ hydrocarbons and the oligomer of $C_9$ hydrocarbons is present, and wherein the number-average molecular weight of the oligomer of $C_5$ hydrocarbons and the oligomer of $C_9$ hydrocarbons ranges from about 100 to about 4,000.

17. The coated proppant of claim 1, wherein at least one of the oligomer of $C_5$ hydrocarbons and the oligomer of $C_9$ hydrocarbons is present, and wherein the number-average molecular weight of the oligomer of $C_5$ hydrocarbons and the oligomer of $C_9$ hydrocarbons ranges from about 200 to about 1,000.

18. The coated proppant of claim 1, wherein the thermoplastic material is selected from among an ethylene vinyl acetate, a pine rosin, a modified rosin, a rosin ester, a coumarone-indene resin, or any combination thereof.

19. The coated proppant of claim 1, wherein thermoplastic material consists essentially of the ethylene vinyl acetate, the pine rosin, the modified rosin, the rosin ester, the coumarone-indene resin, the oligomer of $C_5$ hydrocarbons, the oligomer of $C_9$ hydrocarbons, the oligomeric reaction product of a terpene and a phenolic, or any combination thereof.

20. A method of making a coated proppant, the method comprising applying a coating consisting essentially of a thermoplastic material onto a particle to obtain the coated proppant;
wherein the thermoplastic material comprises at least one of an ethylene vinyl acetate, a pine rosin, a modified rosin, a rosin ester, a coumarone-indene resin, an oligomer of $C_5$ hydrocarbons, an oligomer of $C_9$ hydrocarbons, an oligomeric reaction product of a terpene and a phenolic, or any combination thereof, and wherein the oligomer of $C_5$ hydrocarbons and the oligomer of $C_9$ hydrocarbons each have a number-average molecular weight of less than about 10,000.

21. The method of claim 20, wherein the thermoplastic material comprises an ethylene vinyl acetate, a coumarone-indene resin, an oligomer of $C_5$ hydrocarbons, an oligomer of $C_9$ hydrocarbons, or any combination thereof, and wherein the oligomer of $C_5$ hydrocarbons and the oligomer of $C_9$ hydrocarbons each have a number-average molecular weight of less than about 10,000.

22. The method of claim 20, wherein the thermoplastic material has a thermal transition point temperature in the range from about 30 to about 200° C.

23. The method of claim 20, wherein the thermoplastic material has a thermal transition point temperature in the range from about 60 to about 100° C.

24. The method of claim 20, wherein the weight percent of the coating, based on the weight of the particle, is from about 1% to about 8%.

25. The method of claim 20, wherein the thickness of the coating on the particle is in a range from about 0.1 to about 5 mils.

26. A method of treating a subterranean formation comprising:
introducing a fluid suspension of coated proppants to the subterranean formation, wherein the coated proppants comprise:
a particle; and
a coating consisting essentially of a thermoplastic material on the particle, wherein the thermoplastic material comprises at least one of an ethylene vinyl acetate, a pine rosin, a modified rosin, a rosin ester, a coumarone-indene resin, an oligomer of $C_5$ hydrocarbons, an oligomer of $C_9$ hydrocarbons, an oligomeric reaction product of a terpene and a phenolic, or any combination thereof, wherein the oligomer of $C_5$ hydrocarbons and the oligomer of $C_9$ hydrocarbons each have a number-average molecular weight of less than about 10,000;
depositing the coated proppants in the subterranean formation;
subjecting the coated proppants to a temperature above the thermal transition point temperature of the thermoplastic coating on the particle; and
agglomerating the thermoplastic coating of the coated proppants to form a stable framework of proppant particles.

27. The method of claim 26, wherein the coated proppants are free-flowing and not tacky at ambient conditions of about 20-25° C. and atmospheric pressure.

28. The method of claim 26, wherein the agglomerated framework of proppant particles in the subterranean formation reduces solid particle flow-back from the subterranean formation.

29. The method of claim 26, wherein the agglomerated framework of proppant particles in the subterranean formation reduces the transport of formation fines from the subterranean formation.

30. A coated proppant comprising:
a particle; and
a coating consisting essentially of a thermoplastic material on the particle, wherein the thermoplastic material comprises a pine rosin, a modified rosin, a rosin ester, or any combination thereof.

31. The coated proppant of claim 30, wherein the thermoplastic material comprises a pine rosin, a rosin ester, or a combination thereof.

32. The coated proppant of claim 30, wherein the thermoplastic material comprises a glycerol rosin ester or a pentaerythritol rosin ester.

33. A method of making the coated proppant of claim 30, the method comprising applying the thermoplastic material onto the particle to obtain the coated proppant.

34. The method of claim 33, wherein the thermoplastic material comprises a glycerol rosin ester or a pentaerythritol rosin ester.

35. A method of using the coated proppant of claim 30 to treat a subterranean formation, the method comprising:
introducing a fluid suspension of the coated proppants to the subterranean formation;
depositing the coated proppants in the subterranean formation;
subjecting the coated proppants to a temperature above the thermal transition point temperature of the thermoplastic coating on the particle; and
agglomerating the thermoplastic coating of the coated proppants to form a stable framework of proppant particles.

36. The method of claim 35, wherein the thermoplastic material comprises a glycerol rosin ester or a pentaerythritol rosin ester.

* * * * *